US009887543B1

(12) United States Patent
Chui et al.

(10) Patent No.: US 9,887,543 B1

(45) Date of Patent: Feb. 6, 2018

(54) METHOD AND APPARATUS FOR WAVE DETECTION

(71) Applicant: Marvell International Ltd., Hamilton (BM)

(72) Inventors: Siew Yong Chui, Singapore (SG); Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 251 days.

(21) Appl. No.: 14/843,419

(22) Filed: Sep. 2, 2015

Related U.S. Application Data

(60) Provisional application No. 62/044,847, filed on Sep. 2, 2014.

(51) Int. Cl.

*H01H 83/00* (2006.01)
*H02J 3/00* (2006.01)
*G05F 3/04* (2006.01)

(52) U.S. Cl.

CPC ................ *H02J 3/005* (2013.01); *G05F 3/04* (2013.01)

(58) Field of Classification Search

CPC .............. H05B 33/0815; H05B 33/083; H05B 33/0845

See application file for complete search history.

(56) References Cited

U.S. PATENT DOCUMENTS 5,969,529 A * 10/1999 Eiraku ............... G01R 31/3648 320/136
2014/0091724 A1 * 4/2014 Palmer ................ H02M 3/1582 315/201
2015/0115800 A1 * 4/2015 Vos .................... H05B 33/0857 315/122

* cited by examiner

*Primary Examiner* — Sibin Chen

(57) ABSTRACT

Aspects of the disclosure provide a circuit that includes a switch, a current path circuit and a control circuit. The switch is turned on/off to direct a power supply with a periodic varying voltage to the current path circuit. The current path circuit is coupled with the switch in series to provide a discharge current path to the power supply. The control circuit is configured to detect a time duration during which the periodic varying voltage decreases, and turn on the switch during the time duration to provide the discharge current path to the power supply.

21 Claims, 3 Drawing Sheets

METHOD AND APPARATUS FOR WAVE DETECTION

INCORPORATION BY REFERENCE

This present disclosure claims the benefit of U.S. Provisional Application No. 62/044,847, "METHOD AND APPARATUS FOR WAVE DETECTION" filed on Sep. 2, 2014, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Voltage regulators are used in electronic devices to maintain relative steady supply voltages to drive load devices. In an example, an AC power supply is provided to an electronic device. The electronic device includes a rectifier to rectify the AC voltage, and a voltage regulator to regulate the rectified AC voltage to generate a steady DC voltage. The DC voltage is used to drive, for example, integrated circuits (IC) in the electronic device.

SUMMARY

Aspects of the disclosure provide a circuit that includes a switch, a current path circuit and a control circuit. The switch is turned on/off to direct a power supply with a periodic varying voltage to the current path circuit. The current path circuit is coupled with the switch in series to provide a discharge current path to the power supply. The control circuit is configured to detect a time duration during which the periodic varying voltage decreases, and turn on the switch during the time duration to provide the discharge current path to the power supply.

In an embodiment, the current path circuit is configured to have an adjustable resistivity, and the control circuit is configured to increase the resistivity of the current path circuit during the time duration to provide the discharge current path with a reduced current. In an example, the current path circuit includes a resistive path having a resistor, and a switchable path coupled in parallel with the resistive path, the switchable path being switched on/off to adjust the resistivity of the current path circuit.

According to an aspect of the disclosure, the control circuit includes a delay circuit configured to delay a first signal indicative of the periodic varying voltage to generate a second signal, and a comparator configured to compare the first signal and the second signal, and generate an output base on the comparison to detect a falling edge in the periodic varying voltage. In an embodiment, the control circuit includes an input switch configured to, based on the output of the comparator, switch the delay circuit to delay a third signal indicative of the periodic varying voltage to generate a fourth signal, the third signal has a different level from the first signal. The comparator is configured in a hysteresis configuration to compare, based on the output, the first signal with the second signal or the third signal with the fourth signal.

In an embodiment, the switch includes a depletion mode transistor. In an example, the control circuit is configured to detect the time duration during which an output voltage falls below a threshold voltage level, and turn on the switch during the time duration to provide the discharge current path to the power supply.

Aspects of the disclosure provide a method that includes detecting a time duration during which a power supply with a periodic varying voltage decreases, turning on a switch during the time duration to direct the power supply to a current path circuit, and discharging the power supply via the current path circuit.

Aspects of the disclosure provide an apparatus that includes a rectifier and a regulator circuit. The rectifier is configured to receive an AC power supply and output a rectified AC voltage. The regulator circuit includes a switch, a current path circuit, and a control circuit. The switch that is turned on/off to direct the rectified AC voltage to a current path circuit. The current path circuit is coupled with the switch in series to provide a discharge current path to the rectified AC voltage. The control circuit is configured to detect a time duration during which the rectified AC voltage decreases, and turn on the switch during the time duration to provide the discharge current path to the rectified AC voltage.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
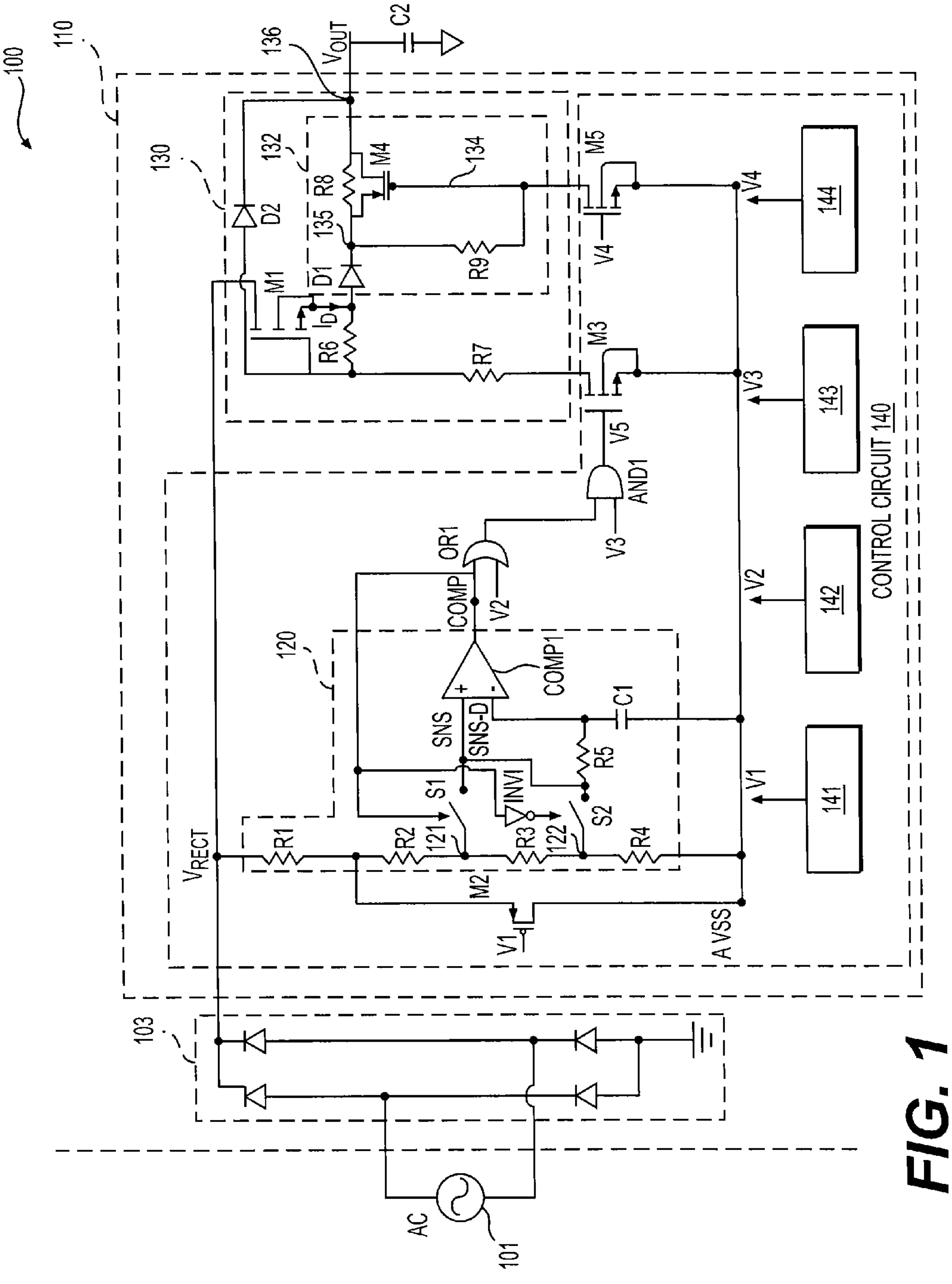
FIG. 1 shows a block diagram of an electronic system 100 coupled to an energy source 101 according to an embodiment of the disclosure.

FIG. 1 shows an electronic system 100 coupled to an energy source 101 according to an embodiment of the disclosure. The electronic system 100 includes a rectifier 103 and a regulator circuit 110 coupled together as shown in FIG. 1.

The energy source 101 provides electric energy to the electronic system 100. In the FIG. 1 example, the energy source 101 is an alternating current (AC) voltage supply to provide an AC voltage, such as 110V AC supply, 220V AC supply, and the like that has a sine wave.

The electronic system 100 can be any suitable system, such as a light emitting diode (LED) lighting system, a fan, a computer, a network switch and the like. The electronic system 100 is suitably coupled with the energy source 101. In an example, the electronic system 100 includes a power cord that can be manually plugged into a wall outlet (not shown) on a power grid. In another example, the electronic system 100 is coupled to a power grid via a switch (not shown). When the switch is switched on, the electronic system 100 is coupled to the energy source 101, and when the switch is switched off, the electronic system 100 is decoupled from the energy source 101.

The rectifier 103 rectifies the received AC voltage to a fixed polarity, such as to be positive. In the FIG. 1 example, the rectifier 103 is a bridge rectifier 103. The bridge rectifier 103 receives the AC voltage, generates a rectified voltage $V_{RECT}$, and provides the rectified voltage $V_{RECT}$ to other components of the electronic system 100, such as the regulator circuit 110 and the like, to provide electric power to the electronic system 100.

In an embodiment, the regulator circuit 110 is implemented using one or more integrated circuit (IC) chips, and/or discrete components. The electronic system 100 can include other suitable components (not shown), such as a light bulb, a plurality of LEDs, a fan, another circuit, and the like, that are suitably coupled with the regulator circuit 110. In an example, the regulator circuit 110 provides control signals to control the operations of the other components. In another example, the regulator circuit 110 receives feedback signals from the other components indicative of the operations of the other components, and provides the control signals to control the operations of the other components based on the feedback signals.

According to an embodiment of the disclosure, the regulator circuit 110 includes a switching circuit 130, and a control circuit 140. The switching circuit 130 is configured to receive power supply, startup and maintain a voltage $V_{OUT}$, and provide the voltage $V_{OUT}$ to other circuits, such as the control circuit 140, to enable the operations of the other circuits. The control circuit 130 is configured to generate control signals to control, for example, the switching circuit 130 after the start-up to maintain the voltage $V_{OUT}$.

In an embodiment, the regulator circuit 110 has an initial power receiving stage and a normal operation stage. In the initial power receiving stage, the switching circuit 130 is in a self-control operation mode and in the normal operation stage, the switching circuit 130 is under the control of the control circuit 140. In the normal operation stage, the control circuit 140 is configured to detect a time duration during which the rectified voltage $V_{RECT}$ decreases (falling edge), and to control the switching circuit 130 to turn on a low current discharging path during the detected time duration to pull down the AC rectified voltage in order to enable appropriate operations by the switching circuit 130 when the regulator circuit 110 drives a relatively low current load.

In an embodiment, the regulator circuit 110 regulates the rectified voltage $V_{RECT}$ to generate a stable DC voltage, such as about 12V. The DC voltage is provided to one or more load devices. In an example, the control circuit 140 controls the switching circuit 130 to switch on/off to pass the rectified voltage $V_{RECT}$ to the load devices. To increase regulating efficiency, in an example, the switching circuit 130 is turned on to conduct a relatively large current for regulating when the rectified AC voltage is relatively low, such as below 60V. However, when the loading current drawn by the load devices is low, the rectified AC voltage may stay high and stop the regulator circuit 110 from regulating.

According to an aspect of the disclosure, the control circuit 140 detects a falling edge in the rectified voltage $V_{RECT}$, and turns on a relatively low current discharging path during the falling edge in order to pull down the rectified voltage $V_{RECT}$. Because the current discharging path is not turned on when the rectified voltage $V_{RECT}$ rises, the power dissipation by the switching circuit 130 can be relatively low, and the low power dissipation can avoid the chip temperature rising beyond thermal capability.

In the FIG. 1 example, the control circuit 140 includes a detection circuit 120 configured to detect a time duration during which the rectified voltage $V_{RECT}$ decreases. The detection circuit 120 is configured to use a comparator that compares a first signal indicative of the rectified voltage $V_{RECT}$ and a second signal that is a delayed version of the first signal. Then, when the first signal is larger than the second signal, the rectified voltage $V_{RECT}$ is rising, and when the first signal is smaller than the second signal, the rectified voltage $V_{RECT}$ is falling.

Further, in the FIG. 1 example, the detection circuit 120 is configured to use hysteresis configuration to reduce unstable transitions due to noise. Specifically, the detection circuit 120 includes a comparator COMP1, two input switches S1 and S2, an inverter INV1, a resistor R5, a capacitor C1, and a voltage divider formed by resisters R1-R4 coupled together as shown in FIG. 1. The resistors R1-R4 are connected in series between the rectified voltage $V_{RECT}$ and another power rail AVSS of a relatively low voltage, such as a negative voltage to form the voltage divider. The voltage divider outputs a first voltage at a node 121 and a second voltage at a node 122 in the FIG. 1 example. The first voltage is higher than the second voltage. Both the first voltage and the second voltage are indicative of the rectified voltage $V_{RECT}$.

Further, the first voltage is provided as an input to the comparator COMP1 via the input switch S1, and the second voltage is provided as an input to the comparator COMP1 via the input switch S2. The resistor R5 and the capacitor C1 form a delay path to delay the input SNS to the comparator COMP1 to generate a delayed input SNS-D. In the FIG. 1 example, the input SNS is provided to the positive input node of the comparator COMP1, and the delayed input SNS-D is provided to the negative input node of the comparator COMP1. The comparator COMP1 compares the input and the delayed input and generates an output COMP based on the comparison. The output COMP is used to switch on/off the input switches S1 and S2.

During operation, in an example, when the rectified voltage $V_{RECT}$ rises, such as at an angle between 45 to 90 in the rectified sine wave, the input switch S1 is switched on (connecting) and the input switch S2 is off (disconnecting), and the first voltage at the node 121 is provided to the comparator COMP1 as the input. Due to the rising curve, the input at the positive input node of the comparator COMP1 is larger than the delayed input at the negative input node of the comparator COMP1, thus the output COMP is logic "1". The output COMP keeps the input switch S1 on, and keeps the input switch S2 off.

In the example, when the rectified voltage $V_{RECT}$ is at a peak, such as 90° in the rectified sine wave, the rectified voltage $V_{RECT}$ starts to drop and the input at the positive input node of the comparator COMP1 starts to fall. After a time related to the RC delay determined by the resistor R5 and the capacitor C1, the input at the positive input node of the comparator COMP1 drops cross and below the delayed input at the negative input node of the comparator COMP1, thus the output COMP changes to logic "0". The output change switches off the switch S1 and switches on the switch S2, and the second voltage at the node 122 is provided to the comparator COMP1 to further drop the input. It is noted that when the output COMP changes from logic "1" to logic "0", a falling edge is detected in the rectified voltage $V_{RECT}$.

In the example, when the rectified voltage $V_{RECT}$ is at a bottom, such as 180' in the rectified sine wave, the rectified voltage $V_{RECT}$ starts to rise, and the input at the positive input node of the comparator COMP1 starts to rise. After a time related to the RC delay determined by the resistor R5 and the capacitor C1, the input at the positive input node of the comparator COMP1 rises cross and above the delayed input at the negative input node of the comparator COMP1, thus the output COMP changes to logic "1". The output change switches on the switch S1 and switches off the switch S2, and the first voltage at the node 121 is provided to the comparator COMP1 as the input.

According to an aspect of the disclosure, the control circuit 140 includes other suitable detection circuits to detect other suitable signal conditions, and control logics that combine the falling edge detection with other signal conditions to generate control signals for control the operation of the switching circuit 130 during the normal operation stage.

In the FIG. 1 example, the switching circuit 130 is self-controlled at a time of power up, and operates under the control of the control circuit 140 after the power-up. For example, at a time when the electronic system 100 starts to receive power from the power supply 101, the regulator circuit 110 enters the initial power receiving stage. In the initial power receiving stage, the control circuit 140 is not operable, and the switching circuit 130 starts to receive power supply and sets up the voltage $V_{OUT}$. In an example, in the initial power receiving stage, the switching circuit 130 charges up a capacitor C2, and the voltage $V_{OUT}$ is the voltage on the capacitor C2. According to an embodiment of the disclosure, the voltage $V_{OUT}$ is used to power up other components, such as the control circuit 140, in the electronic system 100. The control circuit 140 requires a supply voltage to be larger than a threshold. Thus, in an example, before the voltage $V_{OUT}$ on the capacitor C2 is charged up to a certain level, the control circuit 140 is unable to provide suitable control signals to the switching circuit 130, and the switching circuit 130 is in a self-control operation mode that the switching circuit 130 operates without control from other circuits.

When the voltage $V_{OUT}$ on the capacitor C2 is charged up to the certain level, the voltage $V_{OUT}$ is large enough to enable the operations of the control circuit 140, and the regulator circuit 110 enters the normal operation stage. During the normal operation stage, the control circuit 140 provides suitable control signals to the switching circuit 130 to control the switching circuit 130 to suitably charge the capacitor C2 to maintain the voltage $V_{OUT}$ on the capacitor C2.

In the FIG. 1 example, the switching circuit 130 includes a depletion mode transistor M1 coupled in series with a current path 132 to charge the capacitor C2. The current path 132 has adjustable resistivity.

The depletion mode transistor M1 is configured to be conductive when control voltages are not available, such as during the initial power receiving stage, and the like. In the FIG. 1 example, the depletion mode transistor M1 is an N-type depletion mode metal-oxide-semiconductor-field-effect-transistor (MOSFET) that has a negative threshold voltage, such as negative three-volt and the like. It is noted that the regulator circuit 110 can be suitably modified to use a P-type depletion mode MOSFET as the depletion mode transistor M1. Before the regulator circuit 110 enters the initial power receiving stage or at the time when the regulator circuit 110 enters the initial power receiving stage, the gate-to-source and the gate-to-drain voltages of the N-type depletion mode MOSFET 121 are about zero and are larger than the negative threshold voltage, thus an N-type conductive channel exists between the source and drain of the N-type depletion mode MOSFET M1. The N-type depletion mode MOSFET M1 allows an inrush current to enter the regulator circuit 110 and charge the capacitor C2 at the time when the regulator circuit 110 enters the initial power receiving stage.

In the FIG. 1 example, the current path 132 includes a diode D1, resistors R8 and R9, and a transistor M4. These elements are coupled together as shown in FIG. 1. The diode D1 is configured to limit a current direction to charge the capacitor C2, and avoid discharging the capacitor C2 when the instantaneous voltage of the rectified voltage $V_{RECT}$ is lower than the capacitor voltage $V_{OUT}$, for example.

In the FIG. 1 example, the resistor R8 forms a resistive path, and the transistor M4 forms a switchable path in parallel with the resistive path. When the regulator circuit 110 is in the initial power receiving stage, the switchable path is an open path, and thus the resistive path (e.g., the resistor R8) dominates the resistivity of current path 132; and when the regulator circuit 110 is in the normal operation stage, the control circuit 140 provides control signals to switch on/off the switchable path. When the switchable path is switched on in an example and the switchable path dominates the resistivity of the current path 132. In an example, the transistor M4 is an enhance mode transistor, such as an enhance mode P-type MOSFET, configured to have a suitable threshold voltage. The gate voltage of the enhance mode P-type MOSFET transistor M4 is collectively controlled by the resistor R9, and a portion of the control circuit 140, such as a current limit control circuit 144 and a transistor M5.

During the initial power receiving stage, the current limit control circuit 144 is unable to provide suitable control signal to the transistor M5, and the transistor M5 is off and does not conduct current, for example. Thus, there is substantially no current passing through the resistor R9, and the gate voltage of M4 (voltage at node 134) is about the same as the source voltage (voltage at node 135). The diode D1 limits the current direction in the resistor R8, the drain voltage of M4 (voltage at node 136) is lower or about the same as the source voltage (voltage at node 135). Because the gate-source voltage and gate-drain voltage of the enhance mode P-type MOSFET M4 do not satisfy a threshold voltage requirement, thus the enhance mode P-type MOSFET M4 is turned off.

Further, according to an embodiment of the disclosure, the switching circuit 130 includes a second diode D2 that couples the gate of the depletion mode N-type MOSFET transistor M1 to node 136 that has the voltage $V_{OUT}$. The second diode D2 clamps the gate voltage of the depletion mode transistor M1 not to substantially exceed the voltage $V_{OUT}$.

Further, the second diode D2, the first diode D1, and the resistor R8 collectively stable the gate-source voltage ($V_{GS}$) of the depletion mode transistor M1, and the drain current $I_D$ of the depletion mode transistor M1 during the initial power receiving stage. Specifically, during the initial power receiving stage, in an example, when the forward voltage drop of the first diode D1 and of the second diode D2 are about the same, the gate-source voltage $V_{GS}$ of the depletion mode transistor M1 is substantially equal to the negative of the voltage drop on the resistor R8. The configuration of the second diode D2, the first diode D1, the resistor R8 and the depletion mode transistor M1 form a feedback loop to stable the drain current $I_D$.

According to an aspect of the disclosure, during the normal operation mode, the control circuit 140 generates control signals to the gate of the depletion mode transistor M1 and to the gate of the P-type MOSFET transistor M4 to control the operations of the switching circuit 130.

In the FIG. 1 example, the control circuit 140 includes an enable circuit 141 configured to generate an enable signal V1 to enable/disable the detection circuit 120. The enable signal V1 is provided to control a transistor M2. For example, the transistor M2 is a P-type MOSFET transistor.

When the enable signal V1 is logic "1", the transistor M2 is turned off to enable the detection circuit 120, and when the enable signal V1 is logic "0", the transistor M2 is turned on to disable the detection circuit 120.

Further, in an example, the control circuit 140 includes a first level detection circuit 142 and a second level detection circuit 143. The first level detection circuit 142 is configured to generate a signal V2 that indicates whether the output voltage $V_{OUT}$ is lower than, for example 10V. For example, when the output voltage $V_{OUT}$ is lower than 10V, the signal V2 is logic "0", and when the output voltage $V_{OUT}$ is higher than 10V, the signal V2 is logic "1". The second level detection circuit 143 is configured to generate a signal V3 that indicates whether the rectified voltage $V_{RECT}$ is lower than, for example 60V. For example, when the rectified voltage $V_{RECT}$ is lower than 60V, the signal V3 is logic "0", and when the rectified voltage $V_{RECT}$ is higher than 60V, the signal V3 is logic "1".

Further, the control circuit 140 includes suitable logic circuits to combine the falling edge detection with level detections to turn on a low current discharging path in the switching circuit 130 during a time duration at the falling edge to pull down the rectified voltage $V_{RECT}$. For example, the control circuit 140 includes an OR gate OR1 and an AND gate AND1 to combine the falling edge detection with the signals V2 and V3 to a control signal V5. The control signal V5 is provided to the gate of a transistor M3 to turn on/off the transistor M1. The current limit control circuit 144 generates the control signal V4. The control signal V4 is provided to the gate of the transistor M5 to control resistivity of the current path 132.

In the FIG. 1 example, when the output voltage $V_{OUT}$ is above, for example 10V, the control signal V2 is logic "1". Further, when the rectified voltage $V_{RECT}$ is above, for example 60V, the control signal V3 is logic "1", then the control signal V5 is logic "1". Thus, the transistor M3 is turned on to pull down the gate voltage of the transistor M1, thus the transistor M1 is turned off, and the drain current $I_D$ is about zero.

When the output voltage $V_{OUT}$ is lower than, for example 10V, the control signal V2 is logic "1", the capacitor C2 needs to be charged to raise the output voltage $V_{OUT}$. In the FIG. 1 example, when the comparator COMP1 detects a falling edge of the rectified voltage $V_{RECT}$, the output COMP changes from logic "1" to logic "0". Then the control signal V5 changes to logic "0", thus the transistor M3 is turned off. Then, the gate and the source of the transistor M1 are connected via a resistor R6. The transistor M1 is a depletion mode transistor, and thus the transistor M1 is turned on. When the control signal V4 is logic "0", the transistor M5 is turned off, and thus the transistor M4 is turned off, the current path circuit 132 has a relatively large resistivity, and discharges the rectified voltage $V_{RECT}$ at a reduced current to pull down the rectified voltage $V_{RECT}$.

Further, in the FIG. 1 example, when the rectified voltage $V_{RECT}$ is lower than, for example, 60V, the control signal V5 is logic "0", thus the transistor M3 is turned off. Then, the gate and the source of the transistor M1 are connected via the resistor R6. The transistor M1 is a depletion mode transistor, and thus the transistor M1 is turned on. When the control signal V4 is switched from logic "0" to logic "1", the transistor M5 is turned on to pass a current, the current also passes the resistor R9, and causes a voltage drop from node 135 to node 134. In an example, the gate control signal to the transistor M5 is suitable configured such that the voltage drop is enough to turn on the transistor M4 to provide a much lower resistance path than the resistor R8. Thus the current path circuit 132 has a relatively small resistivity, and can conduct a relatively large current.

It is noted that when the control signal is logic "1", the transistor M3 is turned on to pull down the gate voltage of the transistor M1 via a resistor R7. In an example, the power rail AVSS has a negative voltage, thus the depletion mode transistor M1 can be turned off.

Figure 2:
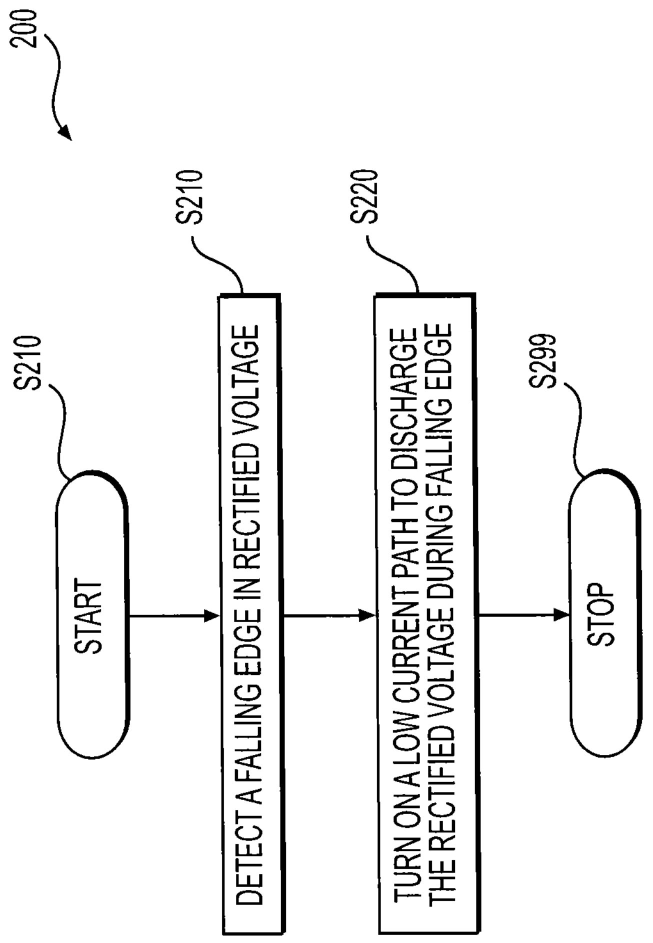
FIG. 2 shows a flow chart outlining a process example 200 according to an embodiment of the disclosure.

FIG. 2 shows a flow chart outlining a process 200 according to an embodiment of the disclosure. In an example, the process 200 is executed in the regulator circuit 110. The process starts at 5201 and proceeds to S210.

At S210, a falling edge in a rectified voltage is detected. In the FIG. 1 example, the comparator COMP1 compares a signal indicative of the rectified voltage $V_{RECT}$ and a delayed version of the signal. In an example, when the output COMP of the comparator COMP1 changes from logic "1" to logic "0", the falling edge is detected.

At 5220, a low current path to discharge the rectified voltage is turned on during the falling edge. In the FIG. 1 example, when the output voltage $V_{OUT}$ is lower than, for example, 10V, which means that more charges are needed to raise the $V_{ouT}$, the control signal V5 is logic "0" to turn off the transistor M3. Then, the depletion mode transistor M1 is turned on. When the control signal V4 is logic "0", the transistor M5 and the transistor M4 are turned off, thus the current path circuit 132 has a relatively large resistivity and conducts a relatively small discharging current to pull down the rectified voltage $V_{RECT}$.

When the rectified voltage $V_{RECT}$ is lower than, for example 60V, the control signal V5 is logic "0" to turn off the transistor M3. Then, the depletion mode transistor M1 is turned on. When the control signal V4 changes from logic "0" to logic "1", the transistor M5 is turned on and the transistor M4 is turned on, thus the current path circuit 132 has a relatively small resistivity and conducts a relatively large discharging current to charge up the capacitor C2 and raise the output voltage $V_{OUT}$. Then the process proceeds to S299 and terminates.

Figure 3:
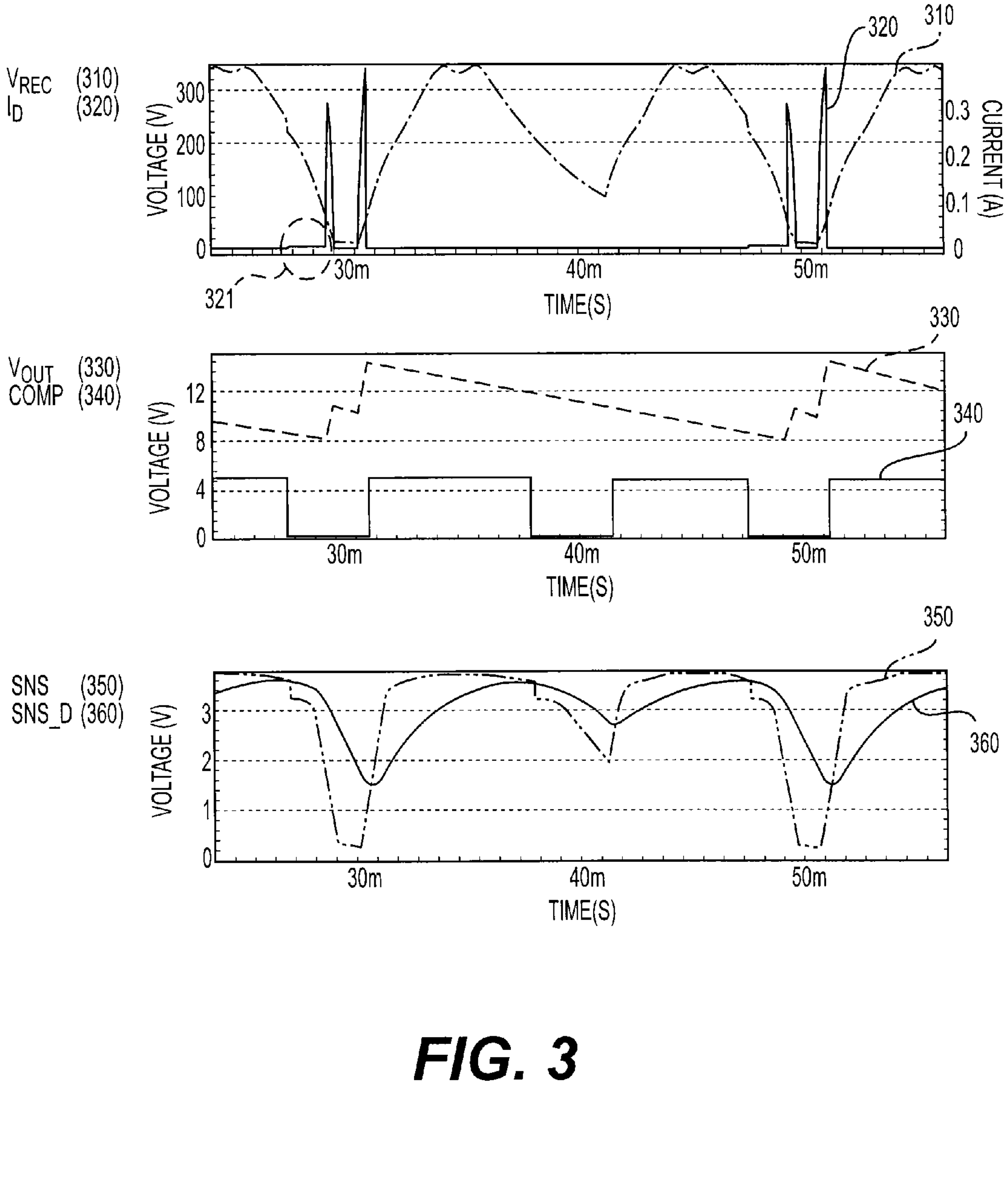
FIG. 3 shows a plot 300 of waveforms according to an embodiment of the disclosure.

FIG. 3 shows a plot of simulation waveforms for the electronic system 100 according to an embodiment of the disclosure. The plot includes a first waveform 310 for the rectified voltage $V_{RECT}$, a second waveform 320 for the drain current $I_D$ of the transistor M1, a third waveform 330 for the output voltage $V_{OUT}$, a fourth waveform 340 for the comparator output COMP, a fifth waveform 350 for the input SNS to the positive input node of the comparator COMP1, a sixth waveform 360 for the delayed input SNS-D to the negative input node of the comparator COMP1.

When the output voltage $V_{OUT}$ is above, for example 10V, the control signal V2 is logic "1". Further, when the rectified voltage $V_{RECT}$ is above, for example 60V, the control signal V3 is logic "1", then the control signal V5 is logic "1". Thus, the transistor M3 is turned on to pull down the gate voltage of the transistor M1, thus the transistor M1 is turned off, and the drain current $I_D$ is about zero, such as shown in FIG. 3 from time 32 ms to time 48 ms.

When the output voltage $V_{OUT}$ is lower than, for example 10V, the control signal V2 is logic "0", more charges are needed to raise the $V_{OUT}$. In the example, the comparator COMP1 compares the input SNS with the delayed-input SNS-D. When the input SNS drops cross the delayed input SNS-D, such as at about time 28 ms, the output COMP changes from logic "1" to logic "0". Because the control signal V2 is logic "0", the change of the output COMP changes the control signal V5 from logic "1" to logic "0". When the control signal V5 is logic "0", the transistor M3 is turned off. Then, the depletion mode transistor M1 is turned on. When the control signal V4 is logic "0", the transistor M5 and the transistor M4 are turned off, thus the current path circuit 132 has a relatively large resistivity and conducts a relatively small discharging current to pull down the rectified voltage $V_{RECT}$, as shown by 321.

When the rectified voltage $V_{RECT}$ drops below, for example 60V, the control signal V3 is logic "0" and thus the control signal V5 is logic "0". When the control signal V5 is logic "0", the transistor M3 is turned off. Then, the depletion mode transistor M1 is turned on. In an example, the control signal V4 is suitably switched from logic "0" to logic "1", then the transistor M5 and the transistor M4 are turned on, thus the current path circuit 132 has a relatively low resistivity and conducts a relatively large charging current, as shown by the current spikes in the drain current $I_D$ to charge the capacitor C2 and raise the output voltage $V_{OUT}$ quickly.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit, comprising:
- a switch that is turned on/off to direct a power supply with a periodic varying voltage to a current path circuit;
- the current path circuit coupled with the switch in series to provide a discharge current path to the power supply; and
- a control circuit configured to detect a time duration during which the periodic varying voltage decreases, and turn on the switch during the time duration to provide the discharge current path to the power supply, wherein the control circuit comprises:
- a delay circuit configured to delay a first signal indicative of the periodic varying voltage to generate a second signal; and
- a comparator configured to compare the first signal and the second signal, and generate an output base on the comparison to detect a falling edge in the periodic varying voltage.

2. The circuit of claim 1, wherein the current path circuit is configured to have an adjustable resistivity, and the control circuit is configured to increase the resistivity of the current path circuit during the time duration to provide the discharge current path with a reduced current.

3. The circuit of claim 2, wherein current path circuit comprises:
- a resistive path having a resistor; and
- a switchable path coupled in parallel with the resistive path, the switchable path being switched on/off to adjust the resistivity of the current path circuit.

4. The circuit of claim 1, wherein
- an input switch configured to, based on the output of the comparator, switch the delay circuit to delay a third signal indicative of the periodic varying voltage to generate a fourth signal, the third signal has a different level from the first signal; and
- the comparator is configured in a hysteresis configuration to compare, based on the output, the first signal with the second signal or the third signal with the fourth signal.

5. The circuit of claim 1, wherein the switch comprises a depletion mode transistor.

6. The circuit of claim 1, wherein the control circuit is configured to detect a voltage on a capacitor is below a threshold voltage level and the time duration, and turn on the switch during the time duration to provide the discharge current path to the power supply in order to trigger charging the capacitor.

7. A method, comprising:
- detecting a time duration during which a power supply with a periodic varying voltage decreases by delaying a first signal indicative of the periodic varying voltage to generate a second signal and comparing the first signal and the second signal to detect a falling edge in the periodic varying voltage:
- turning on a switch during the time duration to direct the power supply to a current path circuit; and
- discharging the power supply via the current path circuit.

8. The method of claim 7, further comprising:
- increasing a resistivity of the current path circuit during the time duration to provide a discharge current path with a reduced current.

9. The method of claim 8, wherein increasing the resistivity of the current path circuit during the time duration to provide the discharge current path with the reduced current comprises:
- switching off a switchable path coupled in parallel with a resistive path in the current path circuit.

10. The method of claim 7, further comprising:
- switching, based on the comparison, a third signal in the place of the first signal, the third signal being indicative of the periodic varying voltage and having a different voltage level from the first signal;
- delaying the third signal to generate a fourth signal; and
- comparing in a hysteresis configuration of the first signal with the second signal or the third signal with the fourth signal.

11. The method of claim 7, further comprising:
- detecting a voltage on a capacitor below a threshold voltage level; and
- discharging the power supply via the current path circuit to trigger charging the capacitor.

12. An apparatus, comprising:
- a rectifier configured to receive an AC power supply and output a rectified AC voltage; and
- a regulator circuit comprising;
  - a switch that is turned on/off to direct the rectified AC voltage to a current path circuit;
  - the current path circuit coupled with the switch in series to provide a discharge current path to the rectified AC voltage; and
  - a control circuit configured to detect a time duration during which the rectified AC voltage decreases, and turn on the switch during the time duration to provide the discharge current path to the rectified AC voltage, wherein the control circuit comprises:
- a delay circuit configured to delay a first signal indicative of the rectified AC voltage to generate a second signal; and
- a comparator configured to compare the first signal and the second signal, and generate an output base on the comparison to detect a falling edge in the rectified AC voltage.

13. The apparatus of claim 12, wherein the current path circuit is configured to have an adjustable resistivity, and the control circuit is configured to increase the resistivity of the current path circuit during the time duration to provide the discharge current path with a reduced current.

14. The apparatus of claim 13, wherein current path circuit comprises:

a resistive path having a resistor; and a switchable path coupled in parallel with the resistive path, the switchable path being switched on/off to adjust the resistivity of the current path circuit.

15. The apparatus of claim 12, wherein an input switch configured to, based on the output of the comparator, switch the delay circuit to delay a third signal indicative of a periodic varying voltage to generate a fourth signal, the third signal has a different level from the first signal; and the comparator is configured in a hysteresis configuration to compare, based on the output, the first signal with the second signal or the third signal with the fourth signal.

16. The apparatus of claim 12, wherein the switch comprises a depletion mode transistor.

17. The apparatus of claim 12, wherein the control circuit is configured to detect a voltage on a capacitor is below a threshold voltage level and the time duration, and turn on the switch during the time duration to provide the discharge current path to the rectified AC voltage in order to trigger charging the capacitor.

18. A circuit, comprising:

a switch that is turned on/off to direct a power supply with a periodic varying voltage to a current path circuit;

the current path circuit coupled with the switch in series to provide a discharge current path to the power supply; and a control circuit configured to detect a time duration during which the periodic varying voltage decreases, and turn on the switch during the time duration to provide the discharge current path to the power supply, wherein the control circuit is configured to detect a voltage on a capacitor is below a threshold voltage level and the time duration, and turn on the switch during the time duration to provide the discharge current path to the power supply in order to trigger charging the capacitor.

19. A method, comprising:

detecting a voltage on a capacitor below a threshold voltage level;

detecting a time duration during which a power supply with a periodic varying voltage decreases;

turning on a switch during the time duration to direct the power supply to a current path circuit; and discharging the power supply via the current path circuit to trigger charging the capacitor.

20. An apparatus, comprising:

a rectifier configured to receive an AC power supply and output a rectified AC voltage; and a regulator circuit comprising;

a switch that is turned on/off to direct the rectified AC voltage to a current path circuit;

the current path circuit coupled with the switch in series to provide a discharge current path to the rectified AC voltage; and a control circuit configured to detect a time duration during which the rectified AC voltage decreases, and turn on the switch during the time duration to provide the discharge current path to the rectified AC voltage, wherein the control circuit is configured to detect a voltage on a capacitor is below a threshold voltage level and the time duration, and turn on the switch during the time duration to provide the discharge current path to the rectified AC voltage in order to trigger charging the capacitor.

21. A circuit, comprising:

a switch that is turned on/off to direct a power supply with a periodic varying voltage to a current path circuit;

the current path circuit coupled with the switch in series to provide a discharge current path to the power supply; and a control circuit configured to detect a time duration during which the periodic varying voltage decreases, and turn on the switch only during the time duration to provide the discharge current path to the power supply.

* * * * *